Patented Jan. 18, 1949

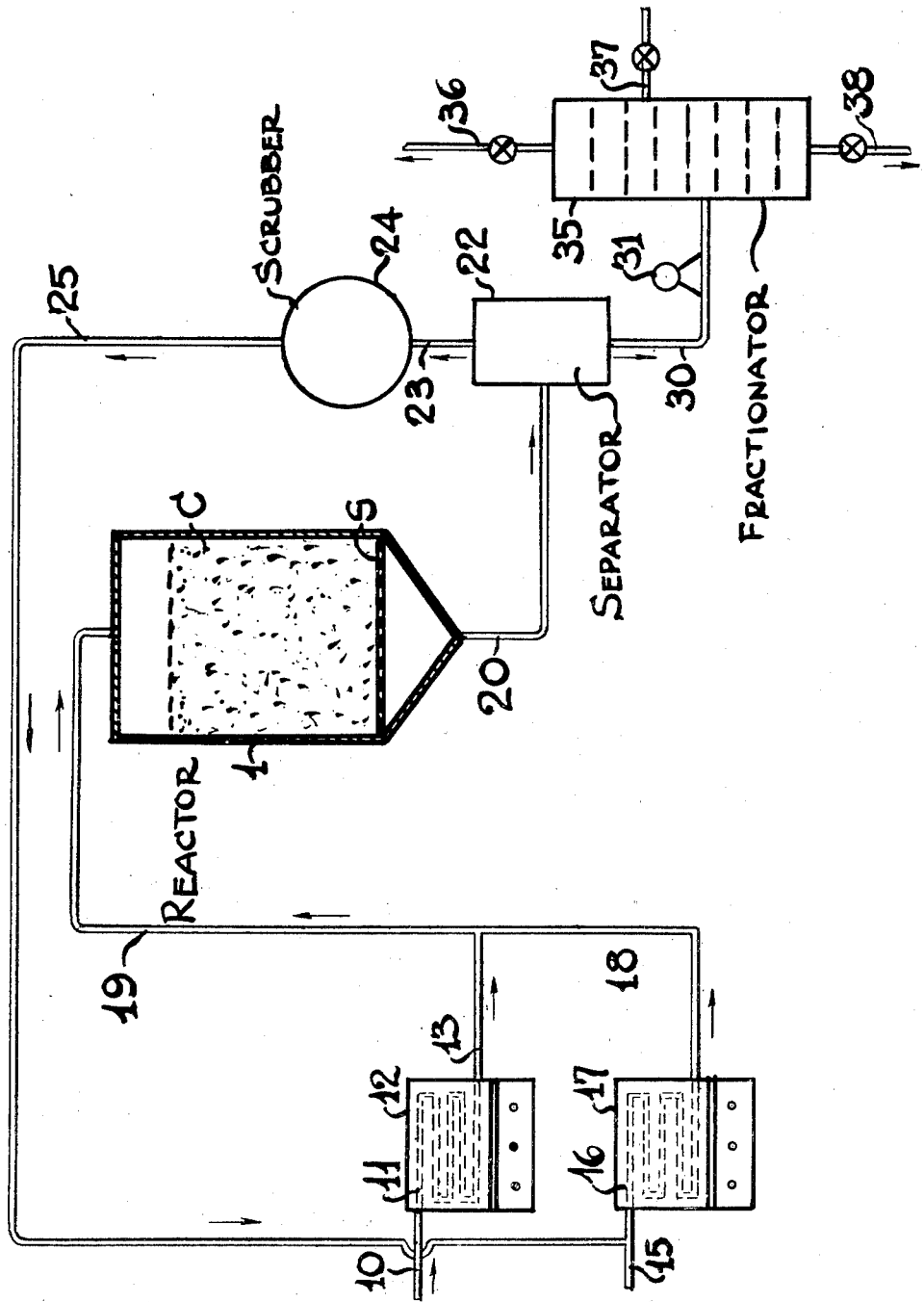

2,459,480

UNITED STATES PATENT OFFICE 2,459,480

METHOD OF CONDITIONING A CATALYST FOR USE IN HYDROFORMING OF NAPHTHAS

Albert B. Welty, Jr., Mountainside, and Clinton H. Holder, Cranford, N. J., assignors to Standard Oil Development Company, a corporation of Delaware Application August 11, 1945, Serial No. 610,343

8 Claims. (Cl. 196—50)

1

Our invention is fully disclosed in the ensuing specification and claims.

In the petroleum industry at the present time a great variety of catalysts are used in various operations. Included in these catalysts are compositions containing polyvalent oxides which are susceptible to valency change. For instance, molybdena or chromia on an alumina-type base constitute the chief components of well-known "hydroforming" catalysts. Catalysts of this type, that is, catalysts which are adapted to promote the dehydrogenation of naphthenic hydrocarbons or other hydrocarbons, can be improved in activity by repeated cyclic reduction and oxidation at elevated temperatures, all of which will appear more fully hereinafter.

The main object of our present invention has to do with increasing the activity of catalysts containing polyvalent heavy metal oxides.

In the accompanying drawing we have shown diagrammatically an arrangement of apparatus elements in which a conventional hydroforming operation may be carried into effect employing a catalyst which has been increased in activity by the method to be described in the present invention.

Referring in detail to the drawing, 1 represents a vessel in which a hydroforming reaction may be carried into effect. By "hydroforming" we mean an operation in which, say, a naphthene-containing naphtha is passed over a catalyst in the presence of added hydrogen at high temperature and under superatmospheric pressure whereupon the naphthenes therein contained are converted to aromatics. This dehydrogenation of naphthenes is the principal reaction, but other reactions, such as hydrogenation of olefins, isomerization, polymerization, and the like, undoubtedly occur. A catalyst C in reactor 1 which is in the form of pills, pellets, shaped bodies, and the like, may at the same time be composed of, say, molybdenum oxide or chromium oxide on an alumina-type base. A very excellent catalyst for the type of operation mentioned is about 10 per cent of chromia or molybdena on a zinc oxide-alumina spinel ($ZnAl_2O_4$). In operating the process, naphtha feed enters the system through line 10, is heated in the coil 11 disposed in a furnace 12 and withdrawn through line 13. Simultaneously, hydrogen-rich gas from line 15 is forced through a fired coil 16 in a furnace 17 and withdrawn through line 18. The confluence of the gasiform material in lines 13 and 18 in line 19 is then forced into the top of reactor 1 and thereafter downwardly therethrough, where-

2 it contacts catalyst and is eventually withdrawn through foraminous member S and a pipe 20 from the reactor. Hereinafter we shall set forth operating conditions, but for the present we will carefully trace the course of the reactants through the system. Reaction products in line 20 are discharged into a high pressure separator 22 from which a gas rich in hydrogen is withdrawn overhead through line 23 thence passed through a scrubber 24 where the gas is scrubbed with an oil adapted to dissolve out hydrocarbons such as methane, ethane, propane, etc., from the mixture to enrich the same in hydrogen, whereupon the hydrogen-enriched gas is withdrawn from 24 through line 25 and recycled through line 15 for further use in the process. The bottoms from high pressure separator 22 are withdrawn through line 30 carrying a pressure reducing valve 31 and thence passed into a fractional distillation tower 35 from which a plurality of fractions may be recovered, including fractions which are normally liquid and are enriched in aromatic hydrocarbons. Hence, benzene, toluene, and xylene fractions may be recovered from fractionator 35 through lines 36, 37, and 38, respectively. Obviously, the nature of the products produced, particularly with regard to their boiling ranges, will depend upon the boiling ranges of the feed stock.

In a hydroforming or reforming operation carbonaceous deposits are unavoidably formed on the catalyst. There comes a time when it is necessary to discontinue the productive phase of the operation to regenerate the catalyst. This is conveniently accomplished by burning off the carbonaceous deposits by treatment of the fouled catalyst with an oxygen-containing gas. For example, the catalyst may be operated in the productive phase for four hours, whereupon it must be discontinued to regenerate the catalyst due to the fact that the said catalyst has been contaminated with deposits, which lower its activity. In that event, therefore, the supply of hydrogen and naphtha to the reaction zone is discontinued and thereafter the catalyst is purged by forcing an inert gas therethrough. This inert gas, which may be nitrogen, flue gas, $CO_2$, or the like, is used to dislodge from the catalyst the more volatile hydrocarbons contained thereon. The catalyst is then treated with an oxygen-containing gas which may be ordinary air or preferably it may be air diluted with a flue gas to the extent that it contains, say, 1 to 10 per cent free oxygen. The regeneration gas is forced through the catalyst for a sufficient period of time to consume by combustion all the coke or carbonaceous deposits on the catalyst whereupon it is again purged with one of the inert gases, previously referred to, to dislodge and displace occluded oxygen. Thereafter, the regenerated and purged catalyst may again be used in the productive phase of the cycle.

The description of a typical process or method of operating the hydroforming process set forth above is conventional, and we do not claim the invention in that procedure. Our invention has to do with alternate oxidation and reduction of the catalyst for the purpose of increasing the activity thereof.

In preparing this catalyst, we proceed as given below. It is to be understood that the specific description given of the preparation of the catalyst is purely illustrative and other means falling within the spirit of our invention may be used.

Solution A.—974 g. of C. P. zinc nitrate $(Zn(NO_3)_2.6H_2O)$ was dissolved in a solution of 179 cc. concentrated nitric acid in 2 liters of distilled water and made up to a volume of 3290 cc.

Solution B.—80 g. pure NaOH was dissolved in 4 liters of distilled water. 800 g. of sodium aluminate was stirred in rapidly. After stirring for two minutes, 500 cc. of Super Hyflo (a ditomaceous earth filter aid) was added. Stirring was continued for one-half minute and the suspension was filtered on a Buchner funnel. 3290 cc. of the filtrate was used for solution B. The resulting solution had a concentration of 101 g. $Al_2O_3$ and 87 g. $Na_2O$ per liter. On this basis, the acidity of the zinc nitrate (solution A) was adjusted to exactly neutralize the alkali of the alumina solution.

Solutions A and B were added at equal rates over a period of 30 minutes to 10 liters of distilled water while stirring. Stirring was continued for 15 minutes after all of A and B had been added and the precipitate filtered. The precipitate was washed with 6 liters $H_2O$, restirred in 12 liters of water, filtered and washed with 6 liters $H_2O$. The precipitate was dried and calcined 3 hours at 1000° F.

The zinc aluminate was mixed for 3 hours in the ball mill with a solution of 81.8 g. of C. P. ammonium molybdate dissolved in a solution of 44 cc. concentrated ammonium hydroxide in 440 cc. $H_2O$. (Additional water was added, sufficient to form a thick paste before mixing.) The mixture was dried, pilled, and calcined for 3 hours at 1000° F.

It will be understood that instead of using molybdenum oxide on zinc spinel we may use other V or VI group heavy metal oxides, such as chromium oxide, vanadium oxide, and the like, as the component of the catalyst. The active component of the catalyst for best results comprises from 5 to 12 weight per cent of the total composition, the remainder, of course, being the zinc spinel base or carrier.

The above catalyst is then treated as follows: It is first heated in air to a temperature within the range of 1100 to 1200° F. for a period of 3 hours. For a good many hydroforming catalysts heat treatment to this extent is sufficient for maximum activity. It has been found, however, that certain catalysts, notably those which exhibit very good stability, may be further improved in activity by additional treatment. An example of such a catalyst is one prepared by the method outlined above. The basis of the present invention lies in subjecting such catalysts to a treatment consisting of cyclic reduction and oxidation. This treatment may be exemplified by the following procedure. The catalyst contained in a vessel maintained at a catalyst temperature of approximately 1100° F. was treated with an inert gas, namely, flue gas, although other gases such as $CO_2$, nitrogen, and the like could have been used, for the purpose of removing oxygen from the reactor. The catalyst was then treated for 15 minutes with hydrogen, the purpose being to reduce the molybdenum oxide approximately to an average valence of four; in other words, until the molybdenum oxide was in the form $MoO_2$. Thereafter the catalyst was again purged with the same inert gas previously used in order to remove the hydrogen. The second purging required 5 minutes. The catalyst was then treated with a stream of air for 35 minutes in order to convert the reduced catalyst back to the trioxide form. A 5-minute purge period followed this air treatment and the cycle was repeated by proceeding with the 15-minute hydrogen treatment. This cyclic reduction and oxidation was repeated hourly for a period of 30 days at an average catalyst temperature of 1100° F. and at atmospheric pressure. The temperature of activation can, of course, be varied over the range of, say, 1000° F. up to 1400° F. and the time required for the test would then differ in an inverse manner with regard to the temperature. The activation treatment may be carried out in any reaction vessel equipped with facilities for the introduction of the gases named above. The latter may be accomplished conveniently by employing a timer and solenoid valves in order to automatically change the flow of the gases.

Both the reduction and oxidation reactions are exothermic and liberate a considerable amount of heat. In fact, the heat of reaction in reoxidizing the molybdena on a typical catalyst would be sufficient to raise the temperature of the molybdena itself about 2000° F., if it were assumed possible to do so without disseminating heat to the catalyst support. This simply illustrates that depending on the rate at which the heat is dissipated, the particles of the oxidizable component of the catalyst may momentarily reach temperatures much higher than those which are recorded. The liberation of heat during the reduction and oxidation is made very evident by the "heat wave" which passes through the catalyst bed during both of these periods. As a result, in the 4 liter vessel actually employed, it was necessary to maintain the lead bath temperature surrounding the reactor at 75 to 200° F. lower temperature than the 1100° F. average catalyst temperature.

Assuming that improvement in catalyst activity due to heat activation is the result of producing some change in the active metal oxide of the catalyst such as causing a more favorable distribution of the somewhat volatile molybdena on the catalyst surface, it then follows that the cyclic reduction and oxidation method which involves introducing heat through the molybdena particles would produce the desired effect, by promoting the redistribution of the molybdena, to a greater extent at a given average catalyst temperature than by heating in the oxidized state, thus avoiding overheating of the catalyst.

In order to test the effectiveness of the oxidation-reduction treatment of the above chemically compounded catalyst, we submitted the catalyst prepared by the above procedure to the cyclic oxidation and reduction treatment. Four other catalysts prepared by chemical compounding by methods previously known (Numbers 1, 3, 4, and 5 below) have also been subjected to this treatment. The improvement in activity is shown in the table below:

*Effect of cyclic reduction and oxidation[1] on the activity of several hydroforming catalysts*

| Cat. No. | Catalyst Description | Total Aromatics Yields in Std. Test[2] | | |
|---|---|---|---|---|
| | | Conventional | Improved Cat. | Change |
| 1 | 6% MoO$_3$ on a very pure Al$_2$O$_3$ base | 29.2 | 46.9 | +17.7 |
| 2 | 10% MoO$_3$ on a zinc aluminate base | 37.6 | 44.2 | +6.6 |
| 3[3] | 8% MoO$_3$ on Al$_2$O$_3$ base of low Na content | 39.6 | 44.2 | +4.6 |
| 4[3] | 10% MoO$_3$ on Al$_2$O$_3$ base of low Na content | 41.5 | 44.1 | +2.6 |
| 5 | 10% MoO$_3$ on Al$_2$O$_3$ base of low Na content containing 5% SiO$_2$ | 45.8 | 48.8 | +3.0 |

[1] 720 one-hour cycles (30 days) of reduction and oxidation at 1100° F. and atmospheric pressure.
[2] Activity test conditions: 1.3 v./v./hr., 200#/square inch, 900° F., 1500 c. f. of H$_2$/bbl., 4 hours' reaction period, 200-270° F. virgin naphtha.
[3] Both of these catalysts contain ball clay as an extrusion aid. They differ in certain details regarding the method of adding the clay.

It will be noted that the extent of the improvement in the activity is quite large in all cases. The foregoing data show that the introduction of heat by the reduction-oxidation treatment through the active metallic oxide accomplishes a distinct improvement in activity and that this improvement is greater than could be obtained by ordinary calcination treatments.

In the foregoing data, by "conventional" we refer to a calcination carried out after the catalyst was formed; that is, after the 6 per cent molybdenum oxide on the alumina base, for example, was formed, it was heated to a temperature of 1200° F. for 3 hours, which is the usual conventional activation treatment.

Numerous modifications of our invention will appear to those who are familiar with this art. These would occur in the case of catalysts consisting of a somewhat volatile metal oxide from the V, VI and VIII series of the periodic table distributed on a catalysts support consisting of alumina, kieselguhr, silica, or the like.

What we claim is:

1. The method of hydroforming a virgin naphtha which comprises contacting said naphtha at elevated temperatures and pressure and in the presence of added hydrogen with a catalyst consisting essentially of a heavy metal oxide selected from the class of group V and group VI heavy metal oxides, carried on a suitable support, the said catalyst before use having been subjected to a series of about 720 cycles of oxidation and reduction at an elevated temperature.

2. The method set forth in claim 1 in which the catalyst is molybdenum oxide carried on a zinc spinel support.

3. The method set forth in claim 1 in which the catalyst before use is subjected to alternate oxidations and reductions at a temperature of about 1100° F.

4. In the conditioning of a catalyst to be employed in the hydroforming of naphthas, the improvement which comprises subjecting the catalyst consisting of a heavy metal oxide selected from the group consisting of heavy metal oxides of group V and group VI of the periodic system, to a series of about 720 cycles of oxidation and reduction at an elevated temperature.

5. The method set forth in claim 4 in which the catalyst is molybdenum oxide carried on zinc spinel.

6. The method set forth in claim 4 in which a cycle including a reduction and an oxidation is completed in approximately an hour.

7. The method set forth in claim 4 in which the catalyst is molybdenum oxide carried on a support.

8. The method set forth in claim 4 in which the temperature employed lies within the range of 1000° F. to 1400° F.

ALBERT B. WELTY, JR.
CLINTON H. HOLDER.

REFERENCES CITED

The following references are of record in the file of this patent:

UNITED STATES PATENTS

| Number | Name | Date |
|---|---|---|
| 2,270,715 | Layng et al. | Jan. 20, 1942 |
| 2,273,864 | Houdry | Feb. 24, 1942 |
| 2,290,845 | Voorhees | July 21, 1942 |
| 2,317,494 | Thomas | Apr. 27, 1943 |
| 2,322,863 | Marschner et al. | June 29, 1943 |
| 2,338,881 | Thomas | Jan. 11, 1944 |
| 2,339,107 | Pier et al. | Jan. 11, 1944 |
| 2,344,330 | Sturgeon | Mar. 14, 1944 |
| 2,392,738 | Holder | Jan. 8, 1946 |